United States Patent
Dover

(10) Patent No.: US 12,432,071 B2
(45) Date of Patent: Sep. 30, 2025

(54) SECURE SERIAL PERIPHERAL INTERFACE (SPI) FLASH

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

(*) Notice: Subject to any disclaimer, the term of this patent is extended or adjusted under 35 U.S.C. 154(b) by 255 days.

(21) Appl. No.: 17/368,386

(22) Filed: Jul. 6, 2021

(65) Prior Publication Data
US 2022/0021544 A1   Jan. 20, 2022

Related U.S. Application Data

(60) Provisional application No. 63/052,122, filed on Jul. 15, 2020.

(51) Int. Cl.
*H04L 9/32*   (2006.01)
*G06F 13/16*   (2006.01)

(52) U.S. Cl.
CPC ........ *H04L 9/3247* (2013.01); *G06F 13/1668* (2013.01); *H04L 9/3242* (2013.01); *G06F 2213/0026* (2013.01)

(58) Field of Classification Search
CPC ... H04L 9/3247; H04L 9/3242; H04L 9/0643; H04L 9/0894; G06F 21/72; G06F 21/60; G06F 21/602; G06F 21/79; G06F 13/1668; G06F 13/16; G06F 2213/0026; G06F 2213/002
See application file for complete search history.

(56) References Cited

U.S. PATENT DOCUMENTS

| | | | | |
|---|---|---|---|---|
| 5,347,648 A | * | 9/1994 | Stamm | G06F 12/0831 714/763 |
| 7,188,282 B2 | * | 3/2007 | Walmsley | B41J 2/04508 713/176 |
| 9,276,812 B1 | * | 3/2016 | Nagargadde | H04L 41/5054 |
| 9,405,707 B2 | * | 8/2016 | Sarangdhar | G06F 12/1408 |

(Continued)

FOREIGN PATENT DOCUMENTS

| CN | 107404768 A | * 11/2017 | |
|---|---|---|---|
| DE | 102012210327 A1 | * 12/2013 | H04L 9/3242 |

(Continued)

OTHER PUBLICATIONS

Luis F. G. Sarmenta, Marten van Dijk, Charles W. O'Donnell, Jonathan Rhodes, and Srinivas Devadas; (Virtual Monotonic Counters and Count-Limited Objects using a TPM without a Trusted OS); p. 15; Published in Nov. 3, 2006.*

*Primary Examiner* — Ali H. Cheema
(74) *Attorney, Agent, or Firm* — Greenberg Traurig

(57) ABSTRACT

The application relates to a secure memory device. The secure memory device includes a controller configured to decode and execute commands issued by a host device; a cryptographic engine, the cryptographic engine configured to authenticate a subset of the commands, the subset of the commands each including a digital signature; and a first monotonic counter, the first monotonic counter being incremented after executing at least some of the subset of the commands, wherein a value of the first monotonic counter is used to generate the digital signature.

20 Claims, 7 Drawing Sheets

(56) References Cited

U.S. PATENT DOCUMENTS

| | | | |
|---|---|---|---|
| 2001/0001155 A1* | 5/2001 | Smith, Sr. | H04L 9/3247 713/170 |
| 2004/0013266 A1* | 1/2004 | Giraud | G06Q 20/3552 380/1 |
| 2004/0215910 A1* | 10/2004 | Okaue | G06F 12/1466 711/164 |
| 2004/0243779 A1* | 12/2004 | Okaue | G06F 21/6209 711/163 |
| 2006/0136752 A1* | 6/2006 | Miller | G06F 21/60 713/194 |
| 2006/0198515 A1* | 9/2006 | Forehand | G06F 21/80 380/28 |
| 2008/0320315 A1* | 12/2008 | Frey | H04L 9/3247 713/189 |
| 2010/0146061 A1* | 6/2010 | Mattsson | H01L 31/1035 709/227 |
| 2013/0326264 A1* | 12/2013 | Resch | G06F 11/1088 714/6.2 |
| 2014/0044265 A1* | 2/2014 | Kocher | G06F 21/64 380/277 |
| 2014/0215139 A1* | 7/2014 | Pekny | G06F 12/145 711/103 |
| 2014/0223198 A1 | 8/2014 | Saranghar et al. | |
| 2016/0112203 A1* | 4/2016 | Thom | G06F 21/72 713/176 |
| 2016/0379015 A1* | 12/2016 | Samsonov | G06F 21/64 713/193 |
| 2017/0329994 A1* | 11/2017 | Le Roy | G06F 21/64 |
| 2018/0316180 A1* | 11/2018 | Batenburg | H02H 1/0007 |
| 2019/0013949 A1 | 1/2019 | Strong et al. | |
| 2019/0066766 A1* | 2/2019 | Lee | G11C 7/1072 |
| 2019/0324672 A1* | 10/2019 | Hasbun | G06F 13/4282 |
| 2020/0004679 A1* | 1/2020 | Szubbocsev | H04L 9/3247 |
| 2020/0084281 A1* | 3/2020 | Ley | H04L 63/0884 |
| 2020/0319809 A1* | 10/2020 | Hasbun | G06F 3/0653 |
| 2021/0011992 A1* | 1/2021 | Wurmfeld | G06F 21/44 |
| 2021/0049309 A1* | 2/2021 | Su | G06F 3/062 |
| 2021/0165720 A1* | 6/2021 | Bode | G06F 11/1448 |
| 2021/0234929 A1* | 7/2021 | Zhao | H04W 12/121 |
| 2022/0005543 A1* | 1/2022 | Mori | G11C 29/70 |
| 2022/0292057 A1* | 9/2022 | Ohba | G06F 16/1824 |

FOREIGN PATENT DOCUMENTS

| | | | | |
|---|---|---|---|---|
| JP | 2011097424 A | * | 5/2011 | |
| WO | WO-2007042608 A1 | * | 4/2007 | H04L 63/08 |

* cited by examiner

SECURE SERIAL PERIPHERAL INTERFACE (SPI) FLASH

RELATED APPLICATIONS

The present application claims the benefit of the filing date of Prov. U.S. Pat. App. Ser. No. 63/052,122, filed Jul. 15, 2020, and entitled "Secure Serial Peripheral Interface (SPI) Flash," the entire disclosure of which application is hereby incorporated herein by reference.

The present application relates to U.S. Pat. No. 10,296, 421, filed Jun. 26, 2017, and Intl Appl. No. PCT/US2019/ 023551, filed Mar. 22, 2019, all of which are incorporated by reference in their entirety.

FIELD OF THE TECHNOLOGY

At least some embodiments disclosed herein relate generally to semiconductor devices and, in particular, to providing a secure interface for accessing a memory device such as a NOR Flash memory device.

BACKGROUND

Currently, many semiconductor devices are used for storing critical information. Examples of such devices include, but are not limited to, NOR Flash, NAND Flash, and other non-volatile semiconductor devices. By default, access to these devices is limited or protected via software or firmware. However, hardware attacks on such devices potentially compromise the integrity of such devices. In general, a hardware attack on a memory device refers to an attack whereby an attacker has physical access to the memory device. For example, an attacker may modify the content of the memory by de-soldering the part and reprogramming it or replacing it. Alternatively, or in conjunction with the foregoing, the attacked may probe commands transmitted to the memory device using a logic analyzer and replay the commands when desired. Various other hardware attacks exist and are not described for the sake of brevity.

Many attacks involve the extraction of a known value in memory. For example, a memory may store security credentials. Despite being encrypted, the attacker can identify the ciphertext for a given, fixed piece of content and use the ciphertext to exploit the memory device or credentials. In essence, if a ciphertext is always associated with a piece of plaintext, the encryption does not adequately protect the underlying plaintext. Thus, a user may use the ciphertext in lieu of the plaintext without "breaking" the encryption since the ciphertext is always the same and can be identified by a hardware attack.

One attempt to thwart this attack is the use of replay-protected monotonic counters (RPMC) or multiple RPMCs. These counters generate pseudo-random values that are appended to commands and responses to ensure that every command or response is unique, preventing a replay of commands.

While RPMCs provide minimal security, they do not fully protect the contents of a memory device. The disclosed embodiments provide additional security built on top of RPMCs that secure memory devices while maintaining backward compatibility with RPMC-enabled devices.

DETAILED DESCRIPTION

The disclosed embodiments are directed to an improved memory system such as a NOR Flash memory device.

The disclosed embodiments leverage RPMC cycles and data packet formats to expand security functionality beyond that provided by RPMC. Additional non-volatile keys may be pre-shared according to any protocol desired by a memory vendor. Anti-replay functionality is implemented via a separate monotonic counter (A-MTC0) that functions as a secure command counter. The value of A-MTC0 increments upon power-on and at the successful completion of a secure command. In some embodiments, it is not incremented for RPMC commands or similar non-secure commands. In one embodiment, A-MTC0 is a 32-bit counter to match RPMC counters and is sufficient given the types of commands that leverage this counter. No changes are made to the existing RPMC counter functionality, and there are no interactions between RPMC and the secure cycle command counter. An A-MTC value is made available in three ways: automatically at powerup, in response to a direct read of security register, and after each successful, secure write command. In the illustrated embodiment, a secure read cycle is done to retrieve HMAC-signed output following one of these three events. Thus, it is significantly easier for software to stay "in sync" with a memory device via such a counter. The disclosed embodiments additionally describe a second additional counter (A-MTC1) available to count power cycles. This counter is informative and used to deactivate security.

The disclosed embodiments utilize a device root key based on a key sharing method chosen by a manufacturer. In one embodiment, a device session key is generated based on an HMAC operation performed on the value of A-MTC1 and the Root Key. This session key derivation method is consistent with the RPMC specification. The secure data packet formats follow the RPMC packet format, as illustrated below:

| Byte | RPMC Command | Secure Write Command |
|---|---|---|
| 1 | CmdType | CmdType |
| 2 | CounterAddr | Config |
| 3 | Reserved | Varies |
| 4-end | Varies | Varies |
| (end-X to end) | Signature | Signature |

Various commands are disclosed herein. The following table briefly illustrates the commands implemented in the disclosed embodiments.

| Command | Operation |
|---|---|
| Auth_Modify | Program/Erase up to 65 kB from Flash or 128 B from SRAM Register |
| Register_Read | Read from register |
| Register_Write | Write to register |
| Request_UID | Read Flash UID, A-MTC, Status Information |
| Provision | Activate security capabilities based on pre-shared key options |
| De-provision | Deactivate security capabilities |
| Auth_Unlock | Authenticated unlock/lock of Flash blocks |
| ACRTM_Update_Start | Initiate command set |
| ACRTM_Update_Finish | Conclude command set |

Figure 1:
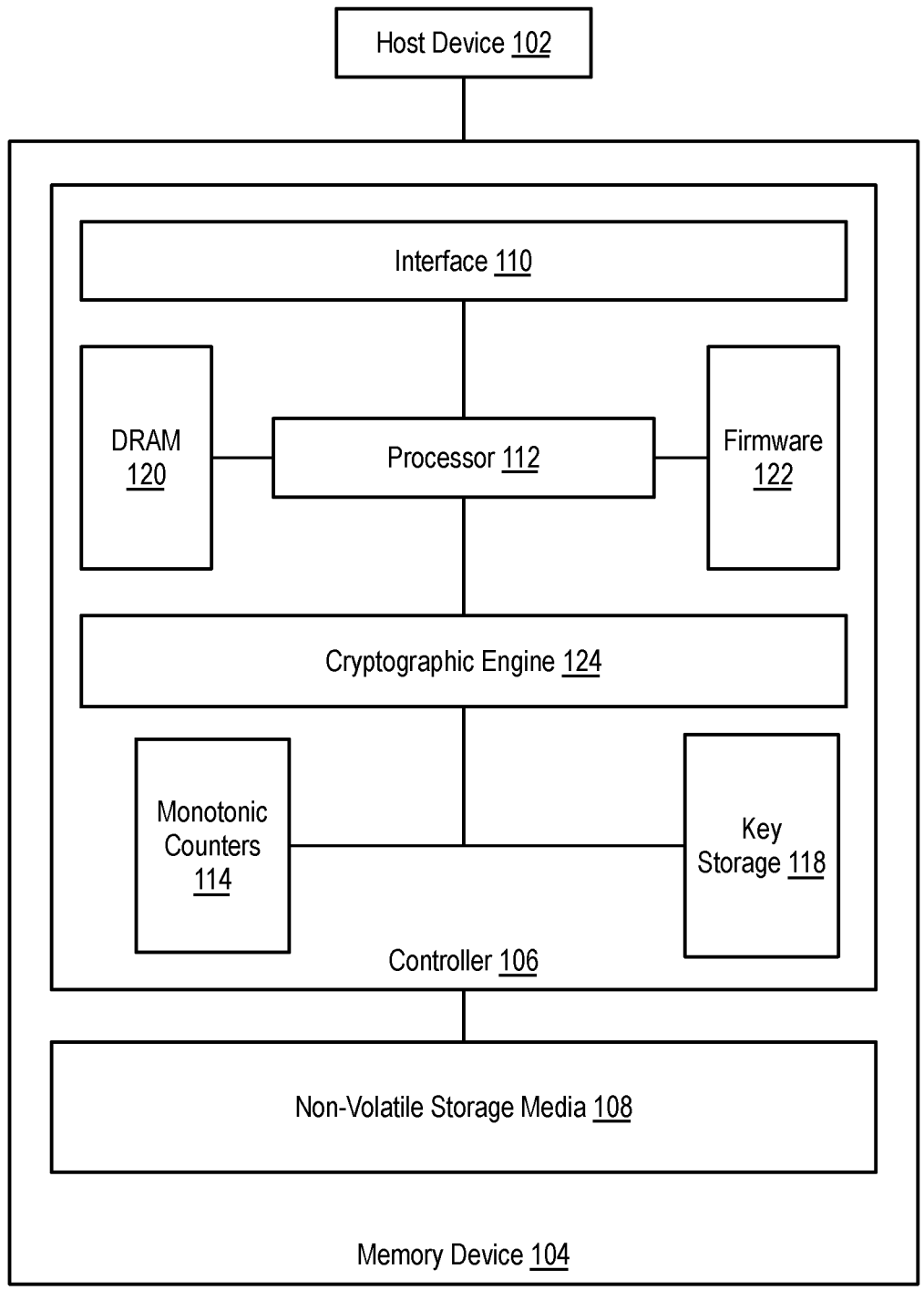
FIG. 1 is a block diagram illustrating a system for securing a memory device according to one embodiment.

FIG. 1 is a block diagram illustrating a system for securing a memory device according to one embodiment.

In FIG. 1, a host device 102 can communicate with the memory device 104 via a communication channel. The host device 102 can be a computer having one or more Central Processing Units (CPUs) to which computer peripheral devices, such as the memory device 104, may be attached via an interconnect, such as a computer bus (e.g., Peripheral Component Interconnect (PCI), PCI eXtended (PCI-X), PCI Express (PCIe)), a communication portion, and/or a computer network.

The memory device 104 can be used to store data for the host device 102, for example, in the non-volatile storage media 108. Examples of memory devices, in general, include hard disk drives (HDDs), solid-state drives (SSDs), flash memory, dynamic random-access memory, magnetic tapes, network-attached storage device, etc. The memory device 104 has a host interface 110 that implements communications with the host device 101 using the communication channel. For example, the communication channel between the host device 102 and the memory device 104 is a Peripheral Component Interconnect Express (PCI Express or PCIe) bus in one embodiment; and the host device 102 and the memory device 104 communicate with each other using NVMe protocol (Non-Volatile Memory Host Controller Interface Specification (NVMHCI), also known as NVM Express (NVMe)).

In some implementations, the communication channel between the host device 102 and the memory device 104 includes a computer network, such as a local area network, a wireless local area network, a wireless personal area network, a cellular communications network, a broadband high-speed always-connected wireless communication connection (e.g., a current or future generation of mobile network link); and the host device 102 and the memory device 104 can be configured to communicate with each other using data storage management and usage commands similar to those in NVMe protocol.

Controller 106 can run firmware (122) to perform operations responsive to the communications from the host device 102 and/or other operations. As will be discussed, these operations may comprise both secure and insecure operations accessing non-volatile storage media 108. Firmware, in general, is a type of computer program that provides control, monitoring, and data manipulation of engineered computing devices. In some embodiments, the firmware controls the operations of controller 106 in operating the memory device 104, such as the operation of the cryptographic engine 124, as further discussed below.

The memory device 104 has non-volatile storage media 108, such as NOR Flash memory, NAND Flash memory, or other types of storage media. The non-volatile storage media 108 is non-volatile in that no power is required to maintain the data/information stored in the non-volatile storage media 108, which data/information can be retrieved after the non-volatile storage media 108 is powered off and then powered on again. The memory cells may be implemented using various memory/storage technologies, such as NAND or NOR gate based flash memory, phase-change memory (PCM), magnetic memory (MRAM), resistive random-access memory, and 3D XPoint, such that the non-volatile storage media 108 is non-volatile and can retain data stored therein without power for days, months, and/or years.

The memory device 104 may include a volatile Dynamic Random-Access Memory (DRAM) (120) for the storage of run-time data and instructions used by controller 106 to improve the computation performance of controller 106 and/or provide buffers for data transferred between the host device 102 and the non-volatile storage media 108. DRAM is volatile in that it requires power to maintain the data/information stored therein, which data/information is lost immediately or rapidly when the power is interrupted.

Volatile DRAM typically has less latency than non-volatile storage media 108 but loses its data quickly when power is removed. Thus, it is advantageous to use the volatile DRAM to temporarily store instructions and data used for controller 106 in its current computing task to improve performance. In some instances, the volatile DRAM is replaced with volatile Static Random-Access Memory (SRAM) that uses less power than DRAM in some applications. When the non-volatile storage media 108 has data access performance (e.g., in latency, read/write speed) comparable to volatile DRAM, the volatile DRAM can be eliminated; and controller 106 can perform computing by operating on the non-volatile storage media 108 for instructions and data instead of operating on the volatile DRAM.

For example, cross point storage and memory devices (e.g., 3D XPoint memory) have data access performance comparable to volatile DRAM. A cross-point memory device uses transistor-less memory elements, each of which has a memory cell and a selector that are stacked together as a column. Memory element columns are connected via two perpendicular layers of wires, where one layer is above the memory element columns and the other layer below the memory element columns. Each memory element can be individually selected at a cross point of one wire on each of the two layers. Cross-point memory devices are fast and non-volatile and can be used as a unified memory pool for processing and storage.

In some instances, controller 106 has in-processor cache memory with data access performance that is better than the volatile DRAM and/or the non-volatile storage media 108. Thus, it is preferred to cache parts of instructions and data used in the current computing task in the in-processor cache memory of controller 106 during the computing operations of controller 106. In some instances, controller 106 has multiple processors, each having its own in-processor cache memory.

Optionally, controller 106 performs data-intensive memory processing using data and/or instructions organized in the memory device 104. For example, in response to a request from the host device 102, controller 106 performs real-time analysis of a set of data stored in the memory device 104 and communicates a reduced data set to the host device 102 as a response. For example, in some applications, the memory device 104 is connected to real-time sensors to store sensor inputs; and the processor 112 of controller 106 are configured to perform machine learning and/or pattern recognition based on the sensor inputs to support an artificial intelligence (AI) system that is implemented at least in part via the memory device 104 and/or the host device 102.

In some implementations, the processors of controller 106 are integrated with memory in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate and decreases latency and power usage.

The memory device 104 can be used in various computing systems, such as a cloud computing system, an edge-computing system, a fog computing system, and/or a stand-alone computer. In a cloud computing system, remote computer servers are connected to a network to store, manage, and process data. An edge computing system optimizes cloud computing by performing data processing at the edge of the computer network that is close to the data source and thus reduces data communications with a centralized server and/or data storage. A fog computing system uses one or more end-user devices or near-user edge devices to store data and thus reduces or eliminates the need to store the data in a centralized data warehouse.

At least some embodiments disclosed herein can be implemented using computer instructions executed by controller 106, such as the firmware. In some instances, hardware circuits can be used to implement at least some of the functions of the firmware. The firmware can be initially stored in the non-volatile storage media 108 or another non-volatile device and loaded into the volatile DRAM and/or the in-processor cache memory for execution by controller 106.

For example, the firmware can be configured to use the techniques discussed below in operating the secure environment. However, the techniques discussed below are not limited to being used in the computer system of FIG. 1 and/or the examples discussed above.

In the illustrated embodiment, the controller further includes a cryptographic engine 124. In one embodiment, cryptographic engine 124 processes all secure commands received by controller 106 over host interface 110. In some embodiments, the secure commands comprise a subset of all commands controller 106 can process. In some embodiments, cryptographic engine 124 may be implemented as part of controller 106 but is illustrated separately for the sake of convenience. The cryptographic engine 124 is communicatively coupled to a key storage 118 and a monotonic counter storage 114. In some embodiments, both of these devices comprise low-latency storage locations such as registers in a register file. In some embodiments, the key storage 118 and monotonic counter storage 114 are populated during power-on from data stored in non-volatile storage media 108, and key storage 118 and a monotonic counter storage 114 are used as caches for the data stored therein. As will be discussed, key storage 118 stores a plurality of cryptographic keys, including a root key set by a manufacturer or other entity and session keys generated each time the memory device 104 powers on. The monotonic counter storage 114 stores a plurality of monotonic counters, and the cryptographic engine 124 is configured to access and update these counters. The cryptographic engine 124 is further configured to verify and execute secure commands. In some embodiments, the cryptographic engine 124 includes a hardware-based hash calculator such as a hardware HMAC-SHA1 calculator. Details of the operations of cryptographic engine 124 are provided in the discussion of FIGS. 2 through 7 below.

Figure 2:
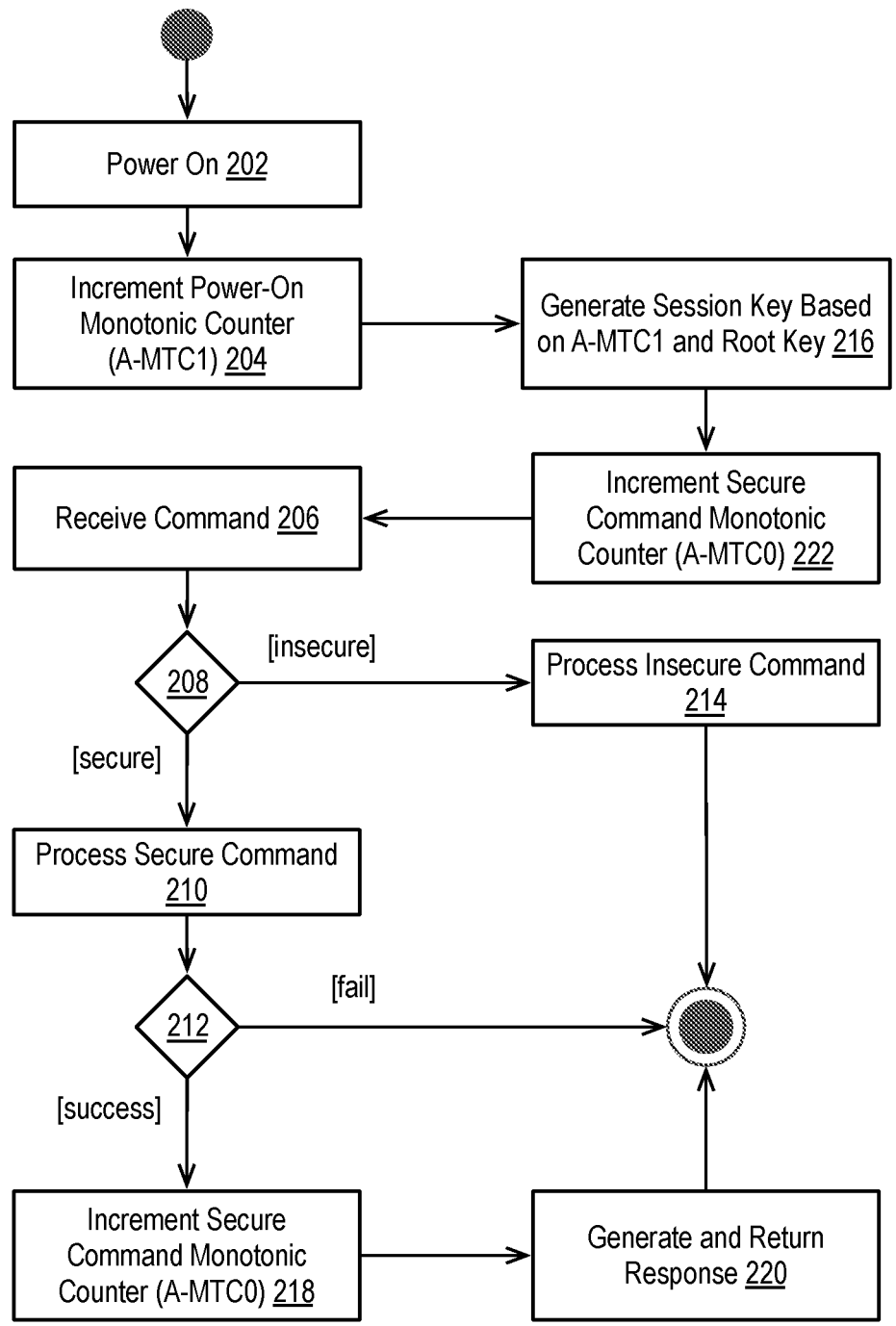
FIG. 2 is a flow diagram illustrating a method for maintaining a plurality of monotonic counters according to some embodiments of the disclosure.

FIG. 2 is a flow diagram illustrating a method for maintaining a plurality of monotonic counters according to some embodiments of the disclosure.

The method illustrated in FIG. 2 begins in step 202 when a memory device powers on. In some embodiments, the methods described in FIGS. 2 through 7 may be implemented in the hardware of the memory device. Alternatively, the methods described in FIGS. 2 through 7 may be implemented in a controller such as a re-programmable microcontroller of a memory device. In either scenario, the method in FIG. 2 executes each time the device powers on.

In step 204, the memory device increments a power-on monotonic counter (MTC). As used herein, the power-on monotonic counter is referred to as A-MTC1. As will be discussed, a separate secure command MTC is referred to as A-MTC0. Both A-MTC0 and A-MTC1 comprise fixed-width counters that increment from a starting value (e.g., 0x0). In some embodiments, A-MTC1 is stored in a non-volatile location (e.g., a sector and page of the underlying non-volatile storage media) to persist across power cycles. Optionally, the value of A-MTC1 may be stored in a register or other low-latency storage location. In this embodiment, the value of A-MTC1 is read from non-volatile storage and written to volatile (e.g., register) storage for quicker access. Since the value of A-MTC1 is only updated at power-on, the copying of the value to a lower-latency storage device may only occur once during the operation of the memory device.

In step 216, the memory device generates a session key based on the value of A-MTC1 and a root key.

In the illustrated embodiment, the memory device is configured to store a root key. This root key comprises a pre-shared key (PSK) used in a symmetric encryption system. In some embodiments, a host device additionally has access to the same PSK, and the host and memory device can securely communicate using the PSK, as will be described. The root key is stored in a secure storage location on the memory device. Optionally, the root key can be written by a manufacturer of the memory device during manufacturing.

As will be described, some or all communications between the memory device and external devices are secured via cryptography. The memory device and external devices utilize session keys that are unique each time the memory device powers on. This prevents re-use of a single key (e.g., a root key) which may lead to vulnerabilities in the memory device. A session key can be generated in various ways, and the specific method of generating a session key should be unduly limited.

As one example, a session key can be generated using the value of A-MTC1 and the root key. In this example, a hash-based message authentication code (HMAC) algorithm (e.g., HMAC-SHA1) is used to generate the session key. The session key in this example can be defined as $K_{session}$=H($K_{root}$, A-MTC1), where H represents the selected HMAC (or similar) function, $K_{root}$ comprises the root key onboard the memory device, and A-MTC1 is the current value of the power-on MTC. In this example and others, the session key is guaranteed to be unique each time the memory device powers on based on the A-MTC1 value.

In step 222, after generating the session key, the memory device increments the value of a secure command monotonic counter (A-MTC0). Optionally, the memory device may bypass step 220. In one embodiment, the value of A-MTC0 is reset to zero during a power cycle. Alternatively, the value of A-MTC0 may persist across power cycles.

After incrementing the value of A-MTC0, the memory device receives a command in step 206. As will be discussed, the command may comprise an insecure command (e.g., an unsigned command) or a secure command. In one embodiment, secure commands comprise a subset of all commands. In general, a secure command will include a signature that can be used to verify the integrity of the sender and message. A secure command is one that executes privileged operations on the underlying non-volatile storage media after authentication. By contrast, an insecure command comprises an existing command that does not utilize the signature and MTC values described in this disclosure. For example, existing RPMC commands may comprise insecure commands in the context of the disclosed embodiments.

If the memory device receives an insecure command in step 208, it processes the insecure command in step 214. The memory device processes insecure commands in any reasonable manner known in the art, and details of processing insecure commands are not provided herein.

If the memory device receives a secure command in step 208, the memory device processes the secure command beginning with step 210. In one embodiment, the memory device can decode the commands. In one embodiment, the memory device can decode both insecure and secure commands. In one embodiment, the memory device can selectively decode only secure commands. The memory device distinguishes between insecure and secure commands during decoding of the commands (e.g., by identifying the opcode and command types). In one embodiment, secure commands comprise a subset of all commands. In one embodiment, the memory device can decode commands based on command structure. In one embodiment, the memory device can decode commands based on an opcode. In one embodiment, the memory device can decode commands based on flags or other content of the commands.

In step 210, the memory device attempts to process the secure command after processing (e.g., performing a decode operation) the command. Details of processing various secure commands are provided in the following flow diagrams and are not repeated herein. In general, processing a secure command includes verifying the signature of a command and inspecting an MTC value in the command. As will be discussed, a secure command includes one or more MTC values synchronized between the issuer of the command (i.e., a host device) and the memory device. The memory device compares the received MTC value to the expected MTC value to prevent replay attacks. Further, the host device signs each command using the session key, and the memory device verifies this signature which guarantees that the sending device has access to the session key (and thus root key), which validates that the sending device is permitted to issue secure commands. Variations on this general approach are described in more detail with respect to the methods depicted in FIGS. 3 through 7.

In step 212, the memory device branches based on whether the secure command was successful. In brief, a secure command will fail for three primary reasons. First, the secure command may fail due to a physical or logical defect. For example, the secure command may access an invalid address, or the memory device may contain a physical defect that prevents it from responding. While such failures occur, they are not addressed in detail in this disclosure. Second, the secure command may fail because the signature cannot be verified. Thus, the secure command may be a valid command, but the lack of a valid signature means that the memory device cannot verify the sender's identity. Thus, the memory device considers this a failed secure command. Third, the MTC value in the command may not match the corresponding MTC value stored by the memory device. In this scenario, the secure command may be a replay of a previous command (particularly when the signature is valid). Thus, the memory device treats this scenario as a failed command as well.

As illustrated in one embodiment, if the memory device detects that a secure command fails, the memory device ceases processing the secure command. Optionally, the memory device may return an error response indicating that the command failed.

Alternatively, if the memory device determines that the secure command is valid and successful, the memory device increments the value of A-MTC0 in step 218. As illustrated, the memory device increments A-MTC0 for each valid secure command and continues incrementing A-MTC0 until the maximum value for A-MTC0 is reached or the device powers off. Optionally, the value of A-MTC0 may overrun and "reset" to zero upon reaching the maximum storable value.

In an optional embodiment, the memory device may only perform step 218 in response to a secure write command. That is, the memory device only increments A-MTC0 in response to a secure request to write data to memory.

In an optional embodiment, the memory device may perform step 218 prior to step 210. In this embodiment, the value of A-MTC0 will be incremented for each secure command received versus for each valid secure command. That is, the memory device will increment A-MTC0 for both valid secure commands and secure commands that are invalid (e.g., having incorrect signatures or MTC values).

In step 220, after incrementing the value of A-MTC0, the memory device generates and returns a response to the secure command. Details of generating responses for specific commands are described in more detail in FIGS. 3-7. In general, the memory device will extract the incremented value of A-MTC0 and, for some commands, the value of A-MTC1. The memory device combines one or more MTC value(s) with the responsive data (e.g., read results, status register data, etc.) and forms a payload. The memory device then generates a digital signature of the payload using a cryptographic function such as an HMAC function.

Similar to the discussion of step 216, the memory device may use an HMAC function to sign the payload using the session key. Thus, the response may comprise the payload and a signature $S = H(K_{session}, payload)$, where H is a cryptographic function such as an HMAC (e.g., HMAC-SHA1) and payload comprises the data to return, including any MTC values.

As will be described in more detail in FIGS. 3 through 7, the receiving device (e.g., a host device) locally stores the MTC values and uses these values in subsequent secure requests, thereby ensuring freshness in the communications with the memory device. In contrast to existing systems that require a host device proactive query for the value of an MTC, the memory device automatically includes the MTC values in each response to a secure command, thus ensuring that the host device is consistently synchronized with the memory device.

The values of A-MTC0 and A-MTC1 may be provided to a host device in various ways. In the illustrated embodiment, the values of A-MTC0 and A-MTC1 are provided in the response packet to a secure command. However, in optional embodiments, the memory device may provide the values of A-MTC0 and A-MTC1 in other manners. As a first example, the memory device may provide the values of A-MTC0 or A-MTC1 when the memory device powers on. Thus, the host device may listen for the values of A-MTC0 or A-MTC1 when the memory device is powered on. As a second example, the memory device may provide the values of A-MTC0 or A-MTC1 via a direct read of registers, including the values of A-MTC0 or A-MTC1. In some embodiments, this direct read may comprise a secure command as described previously. Alternatively, the direct read may comprise an insecure command.

Various steps of the foregoing methods were described as being performed by a memory device. In some embodiments, the steps may be performed by other types of devices in a similar manner. Additionally, various steps may be performed by different components of a memory device.

Figure 3:
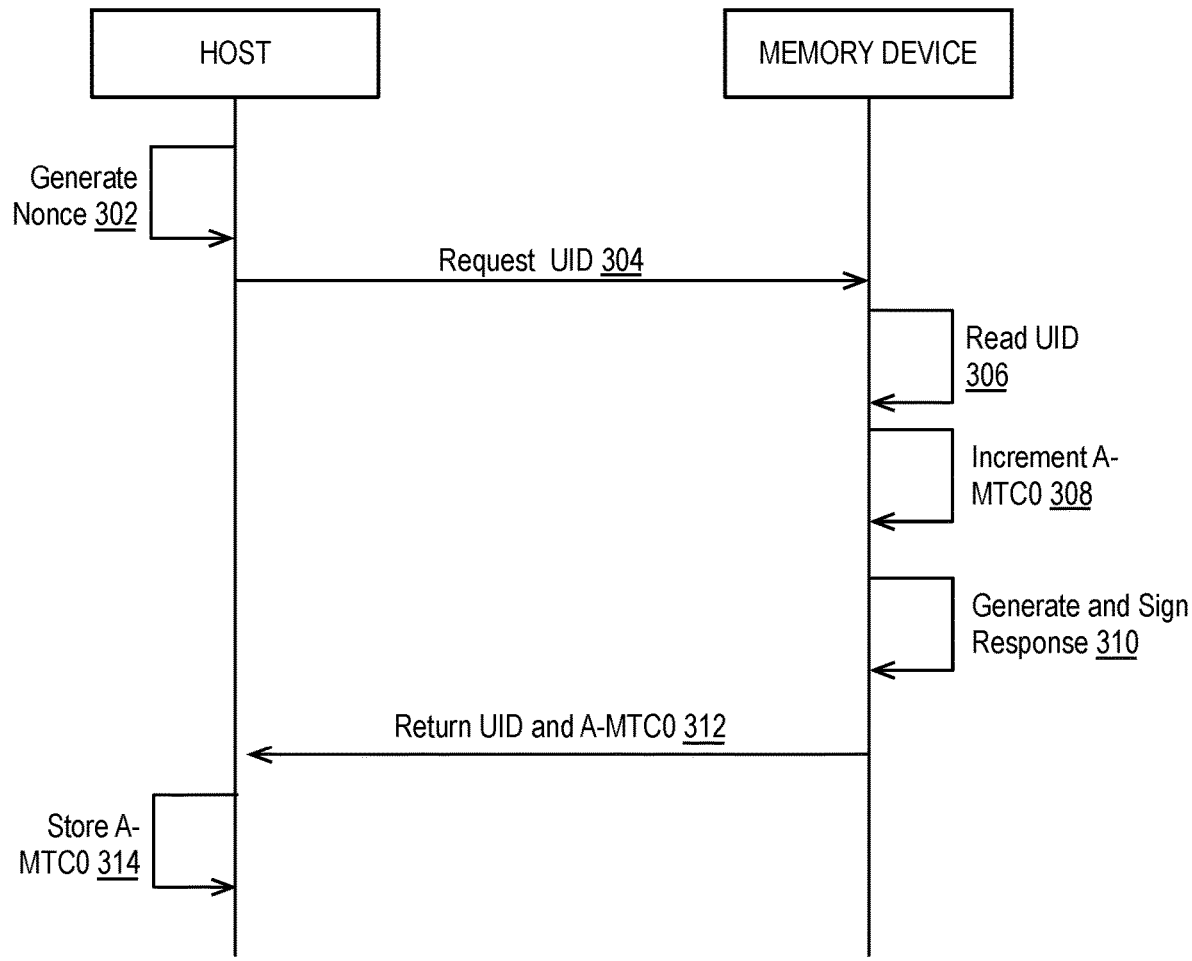
FIG. 3 is a swim lane diagram illustrating a secure command for requesting parameters stored by a memory device according to some embodiments of the disclosure.

FIG. 3 is a swim lane diagram illustrating a secure command for requesting parameters stored by a memory device according to some embodiments of the disclosure. In one embodiment, secure commands comprise a subset of all commands.

In the illustrated embodiment, a host issues a command to a memory device to retrieve a unique identifier (UID) stored by a memory device. In some embodiments, the UID comprises a unique value for the memory device and is unique across all such memory devices manufactured by a single manufacturer.

In step 302, a host device generates a nonce value. In one embodiment, the nonce value comprises a random or pseudo-random value generated on the host. In the illustrated embodiment, the nonce value is utilized to prevent the replay of the command issued in step 304.

In step 304, the host issues a command to request the UID. In some embodiments, the command has the following form:

TABLE 1

REQUEST UID COMMAND FORMAT

| Byte # | 0 | 1 | 2 | 3 | 4 | 5 | 6 |
|---|---|---|---|---|---|---|---|
| Name | Opcode | Type | Config | Nonce | | | |

As illustrated in Table 1, the command includes a pre-determined opcode (e.g., 9Bh) and a type modifier that indicates the specific command (e.g., 0x3E). Optionally, the command includes one byte of configuration data ("Config"). Finally, the trailing four bytes of the command include the host-generated nonce value. The specific form of the command in Table 1, and all Tables, is exemplary only, and other forms may be used. Notably, the command issued in step 304 comprises an unsigned command. Thus, the command may be issued by any device regardless of whether the device includes a pre-shared key (PSK), as will be discussed.

In the illustrated embodiment, the host and memory device may comprise integrated circuit devices communicating over a wired connection such as an SPI or UART connection.

In step 306, after receiving the command, the memory device reads the UID. In some embodiments, the UID comprises a fixed identifier stored permanently on the memory device. In some embodiments, the UID may be stored in a partitioned segment of the non-volatile storage media. In some embodiments, the UID may be burned into fuses of a separate storage location onboard the memory device. The specific method of storing the UID is not limiting.

Next, in step 308, the memory device increments an MTC. In the illustrated embodiment, this MTC corresponds to the secure command MTC and is labeled as A-MTC0. As discussed, the memory device increments the value of A-MTC0 for each secure command that successfully completes. In one embodiment, secure commands comprise a subset of all commands. In the illustrated embodiment, the command issued in step 304 is unsigned and thus is presumed to successfully complete. In some embodiments, when incrementing the value of A-MTC0, the memory device retains the incremented value for inclusion in the responsive packet, as will be discussed.

In step 310, the memory device generates a response packet and signs the response. An example format of a response packet is provided below:

TABLE 2

REQUEST UID RESPONSE FORMAT

| Byte Value | 0 | 1 | 2 | 3 | 4 | 5 | 6 | 7 |
|---|---|---|---|---|---|---|---|---|
| 38h | | | | Signature | | | | |
| 30h | | | | | | | | |
| 28h | | | | | | | | |
| 20h | | | | | | | | |
| 18h | | | | UID | | | | |
| 10h | | | | | | | | |
| 08h | | A-MTC0 | | | | Revision | | Res. |
| 00h | ESR | Reserved | | Prov. Status | | Nonce | | |

In the illustrated embodiment, the response includes a first byte returning the contents of an extended status register (ESR). In some embodiments, the ESR stores the state or status of the memory device and can take one of a known set of values. The specific format of the ESR is not limiting. The response additionally includes various reserved fields (abbreviated as "Res.") that are not limiting.

In the illustrated embodiment, the response additionally returns a one-byte status field representing the provisioning status ("Prov. Status") of the memory device. Provisioning and de-provisioning refer to the enabling and disabling, respectively, of the memory device's security features. Similar to the ESR, the provision status may comprise one of a set of values representing the security configuration of the memory device. In some embodiments, the response additionally includes a 3-byte revision field that returns the current revision of the memory device and/or firmware.

In some embodiments, all of the above-described fields are optional or may be modified based on the needs of the system. By contrast, in most embodiments, the A-MTC0, UID, and signature fields comprise mandatory fields, although the positions of the fields may be varied.

In the illustrated embodiment, the A-MTC0 field returns the current value of the secure command MTC. As illustrated, the MTC value is a 32-bit value, but different widths may be used as appropriate based on the underlying register structure. As described in connection with FIG. 2, the secure command MTC is incremented for each secure command while is not incremented for insecure commands. In the illustrated embodiment, the value of A-MTC0 is incremented in response to the request for a UID. In other alternative embodiments, the value of A-MTC0 may not be increment, and step 308 may be bypassed.

In the illustrated embodiment, the UID comprises a unique identifier for the memory device and comprises a 128-bit identifier. Other identifier widths may be used.

Finally, the response includes a 256-bit signature. In one embodiment, the signature is generated by the memory device using the session key described above. Specifically, in the illustrated embodiment, a one-way hash function (e.g., hash-based message authentication code) may be used to generate the signature. When using a hash-based message authentication code (HMAC), the session key and all of the fields of the response message (less the signature) are used as the inputs to the HMAC. Thus, the HMAC takes the form of $H=(K_{session}, \{A\text{-}MTC0, UID, \ldots\})$ where H comprises an HMAC function such as HMAC-SHA1, A-MTC0 comprises the value of the secure command MTC, UID comprises the unique identifier of the memory device, $K_{session}$ comprises the session key generated at power-on, and the ellipsis represents any additional data in the response (e.g., ESR, provision status, etc.). As illustrated, the values other than $K_{session}$ may be concatenated or otherwise combined to form a single message m, such that m={A-MTC0, UID, ... }, and thus the signature comprises $S=H(K_{session}, m)$.

In step 312, the memory device returns the signed message to the host. As discussed, the signed message includes at least the value of A-MTC0, the value of UID, and a signature.

In step 314, the host extracts the value of A-MTC0 and locally stores this value. In this manner, both the memory device and host are synchronized with the value of A-MTC0, as will be discussed. This is because the memory device continuously provides the freshest value of A-MTC0 during each secure command, thus enabling the host to manage synchronization.

Figure 4:
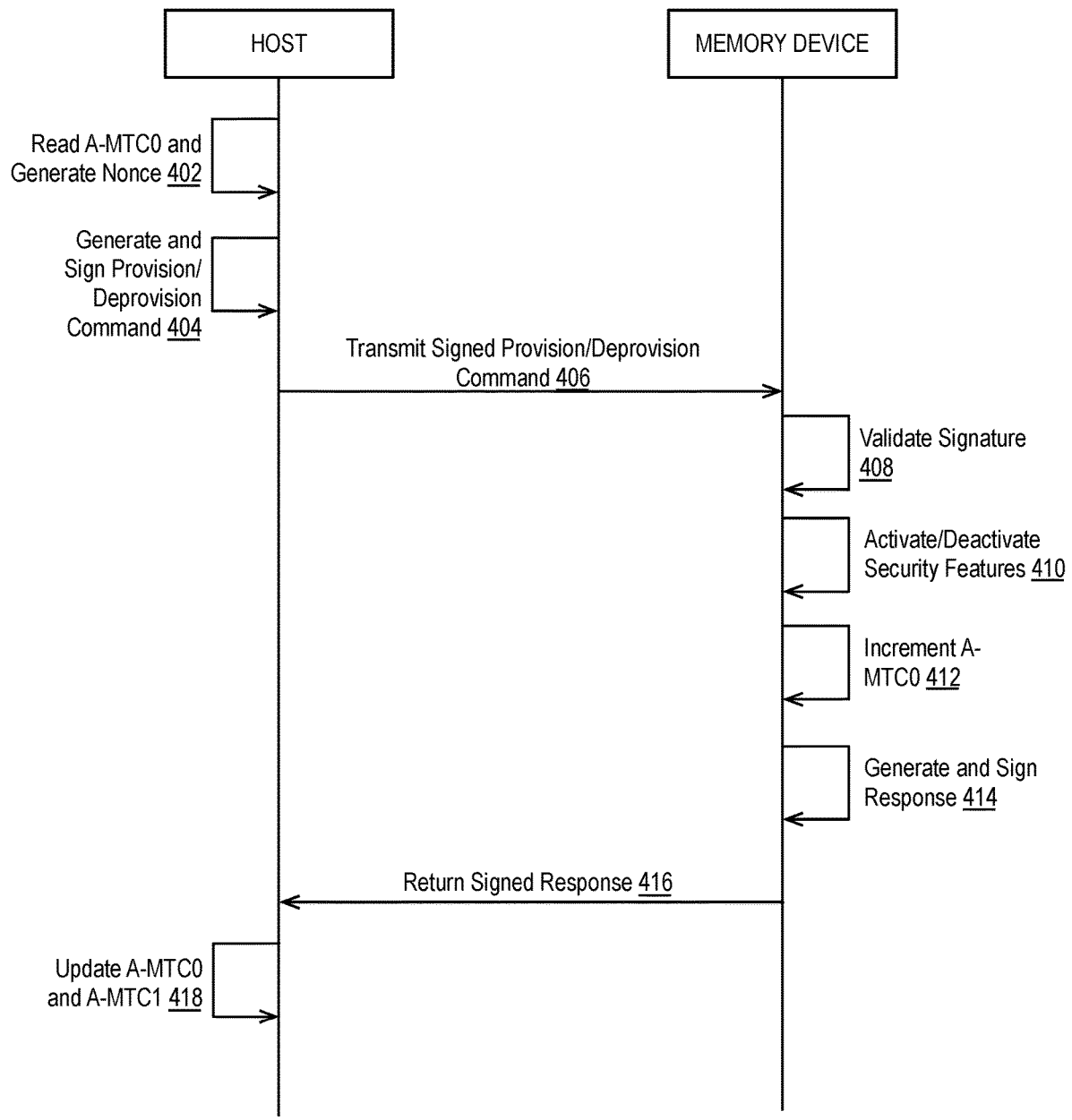
FIG. 4 is a swim lane diagram illustrating secure commands for provisioning and de-provisioning security features of a memory device according to some embodiments of the disclosure.

FIG. 4 is a swim lane diagram illustrating secure commands for provisioning and de-provisioning security features of a memory device according to some embodiments of the disclosure. In one embodiment, secure commands comprise a subset of all commands.

In step 402, the host device reads the value of A-MTC0 and generates a nonce value. The generation of a nonce value was described in FIG. 3 and is not repeated herein. As described above, the host device receives the most up-to-date value of A-MTC0 from the memory device. In step 402, the host device reads this current value prior to sending the provision or de-provision command.

In step 404, the host device signs a provision or de-provision command. In one embodiment, the provision and de-provision commands share the following format:

TABLE 3

PROVISION/DE-PROVISION COMMAND FORMAT

| Byte # | 0 | 1 | 2 | 3 | 4 | 5 | 6 | 7 | ... | 10 |
|---|---|---|---|---|---|---|---|---|---|---|
| Name | Opcode | Type | Config | | Nonce | | | | A-MTC0 Value | |
| Byte # | 11 | — | — | | — | | | | — | — | 42 |
| Name | | | | Signature | | | | | | |

As illustrated in Table 3, the provision and de-provision commands share the same format. The commands both start with a designated opcode (e.g., 9Bh) and include a command type (e.g., 0x35 for provision and 0x33 for de-provision), a one-byte configuration field, and the four-byte host-generated nonce. Additionally, the host device inserts the current value of A-MTC0. In one embodiment, this value is maintained by the host device by receiving the current value from the memory device. As described above, this value may be received when the memory device powers on, in response to an explicit read command, or in response to various secure commands. Finally, the host device generates a secure signature of bytes zero through ten and appends the signature to the first ten bytes. In one embodiment, the signature is generating using an HMAC function such as HMAC-SHA1 using the session key as the signing key. In one embodiment, the host device generates its own session key by retrieving the value of A-MTC1 and generating the session key using the shared root key. In an alternative embodiment, the host device may read the session key directly from the memory device.

In step 406, the host device issues the signed provision or de-provision command to the memory device.

In step 408, the memory device validates the signature. In the illustrated embodiment, the memory device extracts the non-signature bytes of the command and generates its own signature using the session key. If the signature generated by the memory device matches the signature in the command (e.g., by comparing the values), the memory device confirms the authenticity of the sender.

In step 410, the memory device activates security features (for a provision command) or deactivates security features (for a de-provision command). In one embodiment, the memory device updates a configuration or status register that indicates whether secure commands are supported by the memory device. The memory device updates the value of this register based on the provision or de-provision command. In one embodiment, after provisioning, the memory device will accept signed secure commands as described throughout this description. In contrast, when de-provisioning, the memory device will no longer accept secure commands. Optionally, the memory device may ignore secure commands. As another option, the memory device may process secure commands as insecure where appropriate (e.g., reads and writes, but not authenticated locking). As discussed above, the secure command processing routines are stored in firmware or in a dedicated hardware circuit or device. Thus, the memory device "short circuits" this logic when de-provisioning and enables this logic when provisioning.

Next, in step 412, the memory device increments an MTC. In the illustrated embodiment, this MTC corresponds to the secure command MTC and is labeled as A-MTC0. As discussed, the memory device increments the value of A-MTC0 for each secure command that successfully completes. Details of this step have been provided in step 308 of FIG. 3 and are not repeated herein. Optionally, the memory device may not increment A-MTC0 for a provision or de-provision command if the memory device is only configured to update A-MTC0 for secure writing operations.

In step 414, the memory device generates a response packet and signs the response. An example format of a response packet is provided below:

TABLE 4

PROVISION RESPONSE FORMAT

| Byte Value | 0 | 1 | 2 | 3 | 4 | 5 | 6 | 7 |
|---|---|---|---|---|---|---|---|---|
| 38h | | | | Signature | | | | |
| 30h | | | | | | | | |
| 28h | | | | | | | | |
| 20h | | | | | | | | |
| 18h | | | | UID | | | | |
| 10h | | | | | | | | |
| 08h | | A-MTC0 | | | | A-MTC1 | | |
| 00h | ESR | Extended Status | | Res. | | Nonce | | |

The response to a de-provision command may be similarly formatted. The packet in Table 4 shares fields with those of Table 2, and descriptions of those shared fields (e.g., Signature, UID, A-MTC0, ESR, Nonce, etc.) are not repeated herein. The formatting and generation of those fields are incorporated herein in their entirety. In addition to A-MTC0, the response packet additionally includes the power-on A-MTC1 value, which may be retrieved in the same manner as A-MTC0.

In some embodiments, all of the above-described fields are optional or may be modified based on the needs of the system. By contrast, in most embodiments, the A-MTC0, A-MTC1, UID, and signature fields comprise mandatory fields, although the positions of the fields may be varied.

In step 416, the memory device returns the signed message to the host. As discussed, the signed message includes at least the value of A-MTC0, A-MTC1, and a signature.

In step 418, the host extracts the value of A-MTC0 and A-MTC1 and locally stores these values. In this manner, both the memory device and host are synchronized with the values of A-MTC0 and A-MTC1, as will be discussed. This is because the memory device continuously provides the freshest value of A-MTC0 during each secure command, thus enabling the host to manage synchronization.

Figure 5:
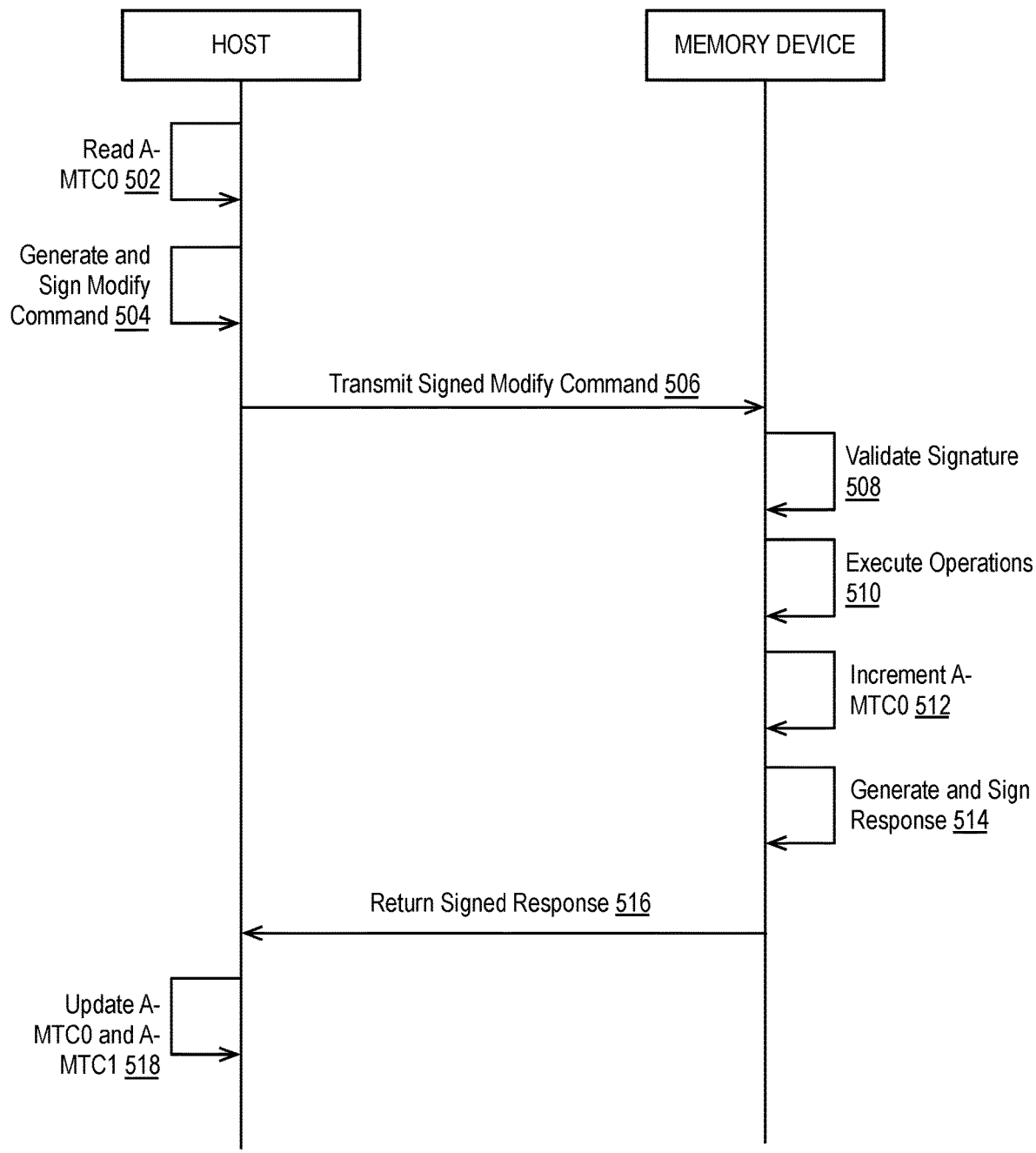
FIG. 5 is a swim lane diagram illustrating secure commands for securing reading and writing data to media of a memory device according to some embodiments of the disclosure.

FIG. 5 is a swim lane diagram illustrating secure commands for securing reading and writing data to media of a memory device according to some embodiments of the disclosure. In one embodiment, secure commands comprise a subset of all commands.

In step 502, the host device reads the value of A-MTC0. As described above, the host device receives the most up-to-date value of A-MTC0 from the memory device. In step 502, the host device reads this current value prior to sending the provision or de-provision command.

In step 504, the host device generates and signs an authenticated modify command to program or erase data from the media of the memory device. In one embodiment, the authenticated modify command has the following format:

TABLE 5

AUTHENTICATED MODIFY COMMAND FORMAT

| Byte # | 0 | 1 | 2 | 3 | 4 | — | 7 | 8 | 11 |
|---|---|---|---|---|---|---|---|---|---|
| Name | Opcode | Type | Config | | A-MTC0 | | | Source Address | |
| | z | z | z | z | z | z | z | z | z |

| Byte # | 12 | — | 15 | 16 | 17 | 18 | 19 | 50 |
|---|---|---|---|---|---|---|---|---|
| Name | Destination Address | | | Size | | | Signature | |

As illustrated in Table 5, the authenticated modify starts with a designated opcode (e.g., 9Bh) and includes a command type (e.g., 0x34), a two-byte configuration field specifying any options for the command, and a four-byte value of A-MTC0. As with other commands, this value is maintained by the host device by receiving the current value from the memory device. As described above, this value may be received when the memory device powers on, in response to an explicit read command, or in response to various secure commands.

The command additionally includes three-bit source and destination address fields and a three-bit size field. The specific format of these fields may vary depending on implementation but generally include any field required to support a program or erase (or similar) operation on a memory device.

Finally, the host device generates a secure signature of bytes zero through eighteen and appends the signature to the first eighteen bytes. In one embodiment, the signature is generating using an HMAC function such as HMAC-SHA1 using the session key as the signing key. In one embodiment, the host device generates its own session key by retrieving the value of A-MTC1 and generating the session key using the shared root key. In an alternative embodiment, the host device may read the session key directly from the memory device.

In step 506, the host device issues the signed authenticated modify command to the memory device.

In step 508, the memory device validates the signature. In the illustrated embodiment, the memory device extracts the non-signature bytes of the command and generates its own signature using the session key. If the signature generated by the memory device matches the signature in the command (e.g., by comparing the values), the memory device confirms the authenticity of the sender.

In step 510, the memory device executes the requested program or erase operations represented in the authenticated modify command. In some embodiments, the program or erase may be performed in any manner known in the art to program or erase a memory device.

Next, in step 512, the memory device increments an MTC. In the illustrated embodiment, this MTC corresponds to the secure command MTC and is labeled as A-MTC0. As discussed, the memory device increments the value of A-MTC0 for each secure command that successfully completes. Details of this step have been provided in step 308 of FIG. 3 and are not repeated herein. Optionally, the memory device may not increment A-MTC0 for a provision or de-provision command if the memory device is only configured to update A-MTC0 for a program operation.

In step 514, the memory device reads the value of A-MTC1, and in step 616, it generates a response packet and signs the response. An example format of a response packet is provided below:

TABLE 6

PROVISION RESPONSE FORMAT

| Byte Value | 0 | 1 | 2 | 3 | 4 | 5 | 6 | 7 |
|---|---|---|---|---|---|---|---|---|
| 38h | | | | Signature | | | | |
| 30h | | | | | | | | |
| 28h | | | | | | | | |
| 20h | | | | | | | | |
| 18h | | | | Reserved | | | | |
| 10h | | Source Address | | | | Destination Address | | |

TABLE 6-continued

PROVISION RESPONSE FORMAT

| Byte Value | 0 | 1 | 2 | 3 | 4 | 5 | 6 | 7 |
|---|---|---|---|---|---|---|---|---|
| 08h | | A-MTC0 | | | | A-MTC1 | | |
| 00h | ESR | Extended Status | | Res. | | Size | | DupSig |

The packet in Table 6 shares fields with those of Tables 2 and 4, and descriptions of those shared fields (e.g., Signature, A-MTC0, A-MTC1 ESR, etc.) are not repeated herein. The formatting and generation of those fields are incorporated herein in their entirety.

As illustrated, in addition to A-MTC0, the response packet additionally includes the power-on A-MTC1 value, which may be retrieved in the same manner as A-MTC0. Since a register read is not signed, the register read command may be used to obtain the current value of A-MTC1. Then, as described above, a host device may utilize that value of A-MTC1 to generate a session key. Thus, in some embodiments, the host device will read a register value prior to issuing (and signing) secure commands. The response packet either returns the register value requested in a read command or a zero-padded copy of the data to write in a write command. Additionally, in some embodiments, the command includes a duplicate signature (DupSig) which comprises a portion of the total signature. Finally, the source, destination, and size fields may be returned to the host device to confirm the operation.

In some embodiments, all of the above-described fields are optional or may be modified based on the needs of the system. By contrast, in most embodiments, the A-MTC0, A-MTC1, and signature fields comprise mandatory fields, although the positions of the fields may be varied.

In step 516, the memory device returns the signed message to the host. As discussed, the signed message includes at least the value of A-MTC0, A-MTC1, and a signature.

In step 518, the host extracts the value of A-MTC0 and A-MTC1 and locally stores these values. In this manner, both the memory device and host are synchronized with the values of A-MTC0 and A-MTC1, as will be discussed. This is because the memory device continuously provides the freshest value of A-MTC0 during each secure command, thus enabling the host to manage synchronization.

Figure 6:
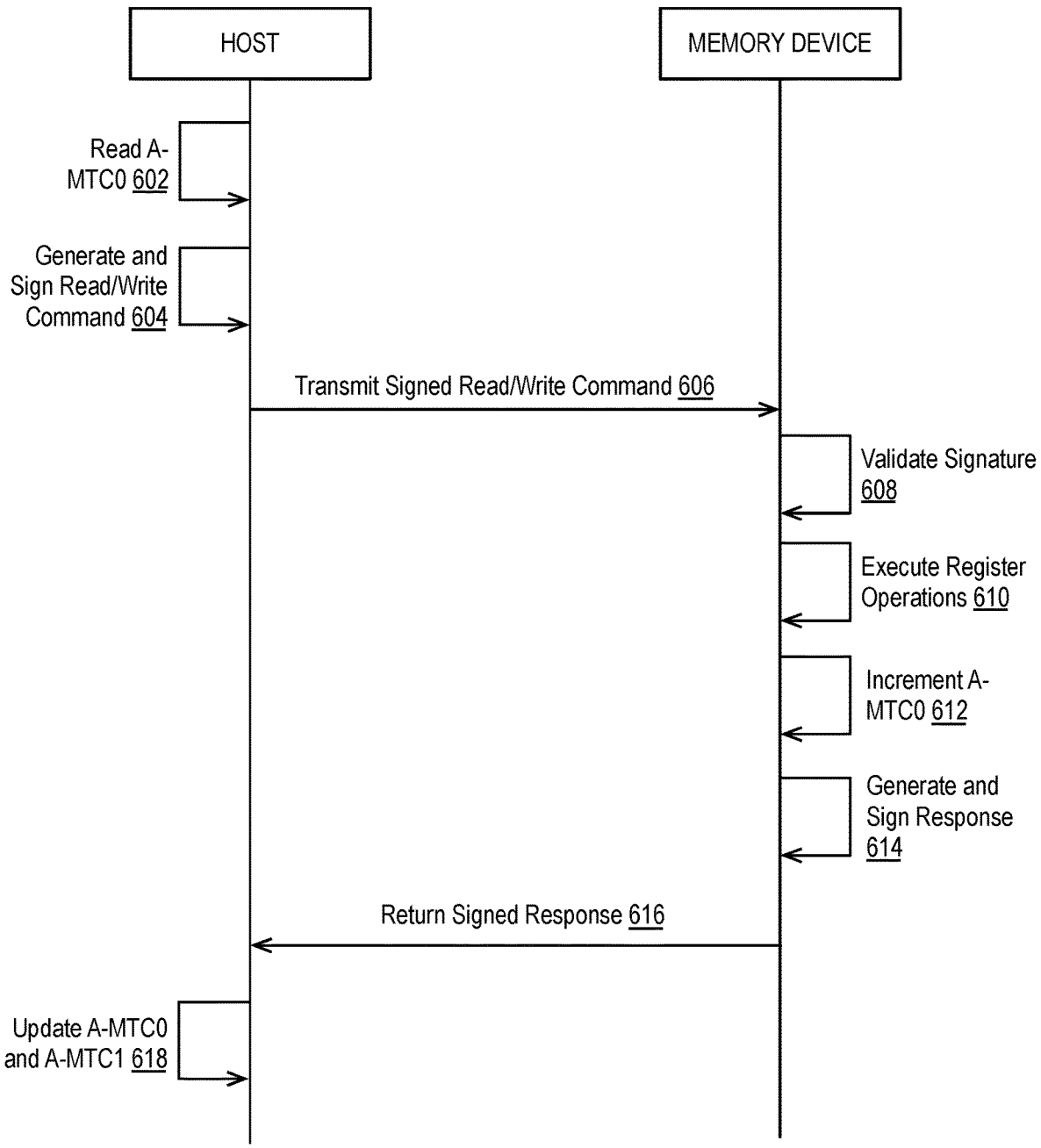
FIG. 6 is a swim lane diagram illustrating secure commands for securing reading and writing register data of a memory device according to some embodiments of the disclosure.

FIG. 6 is a swim lane diagram illustrating secure commands for securing reading and writing register data of a memory device according to some embodiments of the disclosure. In one embodiment, secure commands comprise a subset of all commands.

In step 602, the host device reads the value of A-MTC0. As described above, the host device receives the most up-to-date value of A-MTC0 from the memory device. In step 602, the host device reads this current value prior to sending the provision or de-provision command.

In step 604, the host device generates and signs a secure register read or write command to read or write data from the registers of the memory device. In one embodiment, the secure read or write commands have the following format:

TABLE 7

SECURE READ REGISTER COMMAND FORMAT

| Byte # | 0 | 1 | 2 | 3 | 4 | 5 | 6 | 7 | — | 8 |
|---|---|---|---|---|---|---|---|---|---|---|
| Name | Opcode | Type | Config | | A-MTC0 | | | | Register Address | |

TABLE 8

SECURE WRITE REGISTER COMMAND FORMAT

| Byte # | 0 | 1 | 2 | 3 | 4 | 5 | 6 | 7 | — | 8 |
|---|---|---|---|---|---|---|---|---|---|---|
| Name | Opcode | Type | Config | | A-MTC0 | | | | Register Address | |
| Byte # | 9 | 10 | 11 | 12 | 13 | | | | — | 44 |
| Name | Data | | | | | | | | Signature | |

As illustrated in Tables 7 and 8, the secure register read and write commands share the same format for bytes zero through eight. The commands both start with a designated opcode (e.g., 9Bh) and include a command type (e.g., 0x38 for read, 0x3C for write), a one-byte configuration field, a four-bit value of A-MTC0, and a two-bit register address to read from or write to, respectively. Additionally, the write register command in Table 8 includes four bits of arbitrary data to write. Notably, in the illustrated embodiment, only the write register command includes a signature field. As with previous commands, the host device generates this signature based on the data in bytes zero through twelve of Table 8. In one embodiment, the signature is generating using an HMAC function such as HMAC-SHA1 using the session key as the signing key. In one embodiment, the host device generates its own session key by retrieving the value of A-MTC1 and generating the session key using the shared root key. In an alternative embodiment, the host device may read the session key directly from the memory device.

In step 606, the host device issues the signed read or write register command to the memory device.

In step 608, the memory device validates the signature. In the illustrated embodiment, the memory device extracts the non-signature bytes of the command and generates its own signature using the session key. If the signature generated by the memory device matches the signature in the command (e.g., by comparing the values), the memory device confirms the authenticity of the sender. As illustrated in Table 7, step 608 may be bypassed for register reads.

In step 610, the memory device reads or writes to the identified register after authenticating the command. The memory device reads or writes to a register in any manner known in the art.

Next, in step 612, the memory device increments an MTC. In the illustrated embodiment, this MTC corresponds to the secure command MTC and is labeled as A-MTC0. As discussed, the memory device increments the value of A-MTC0 for each secure command that successfully completes. Details of this step have been provided in step 308 of FIG. 3 and are not repeated herein. Optionally, the memory device may not increment A-MTC0 for a provision or de-provision command if the memory device is only configured to update A-MTC0 for secure writing operations such as a register write.

In step 614, the memory device generates a response packet and signs the response. An example format of a response packet is provided below:

TABLE 9

REGISTER READ/WRITE RESPONSE FORMAT

| Byte Value | 0 | 1 | 2 | 3 | 4 | 5 | 6 | 7 |
|---|---|---|---|---|---|---|---|---|
| 38h | Signature | | | | | | | |
| 30h | | | | | | | | |
| 28h | | | | | | | | |
| 20h | | | | | | | | |
| 18h | For Read: Register value | | | | | | | |
| 10h | For Write: Zero-Padded Written data | | | | | | | |
| 08h | A-MTC0 | | | | A-MTC1 | | | |
| 00h | ESR | Extended Status | Res. | | Reg. Addr. | | Res. | Res. |

The packet in Table 9 shares fields with those of Table 3, and descriptions of those shared fields (e.g., Signature, A-MTC0, ESR, etc.) are not repeated herein. The formatting and generation of those fields are incorporated herein in their entirety.

As illustrated, in addition to A-MTC0, the response packet additionally includes the power-on A-MTC1 value which may be retrieved in the same manner as A-MTC0. Since a register read is not signed, the register read command may be used to obtain the current value of A-MTC1. Then, as described above, a host device may can utilize that value of A-MTC1 to generate a session key. Thus, in some embodiments, the host device will read a register value prior to issuing (and signing) secure commands. The response packet either returns the register value requested in a read command or a zero-padded copy of the data to write in a write command. Both commands include the register address affected.

In some embodiments, all of the above-described fields are optional or may be modified based on the needs of the system. By contrast, in most embodiments, the A-MTC0, A-MTC1, and signature fields comprise mandatory fields, although the positions of the fields may be varied.

In step 616, the memory device returns the signed message to the host. As discussed, the signed message includes at least the value of A-MTC0, A-MTC1, and a signature.

In step 618, the host extracts the value of A-MTC0 and A-MTC1 and locally stores these values. In this manner, both the memory device and host are synchronized with the values of A-MTC0 and A-MTC1, as will be discussed. This is because the memory device continuously provides the freshest value of A-MTC0 during each secure command, thus enabling the host to manage synchronization.

Figure 7:
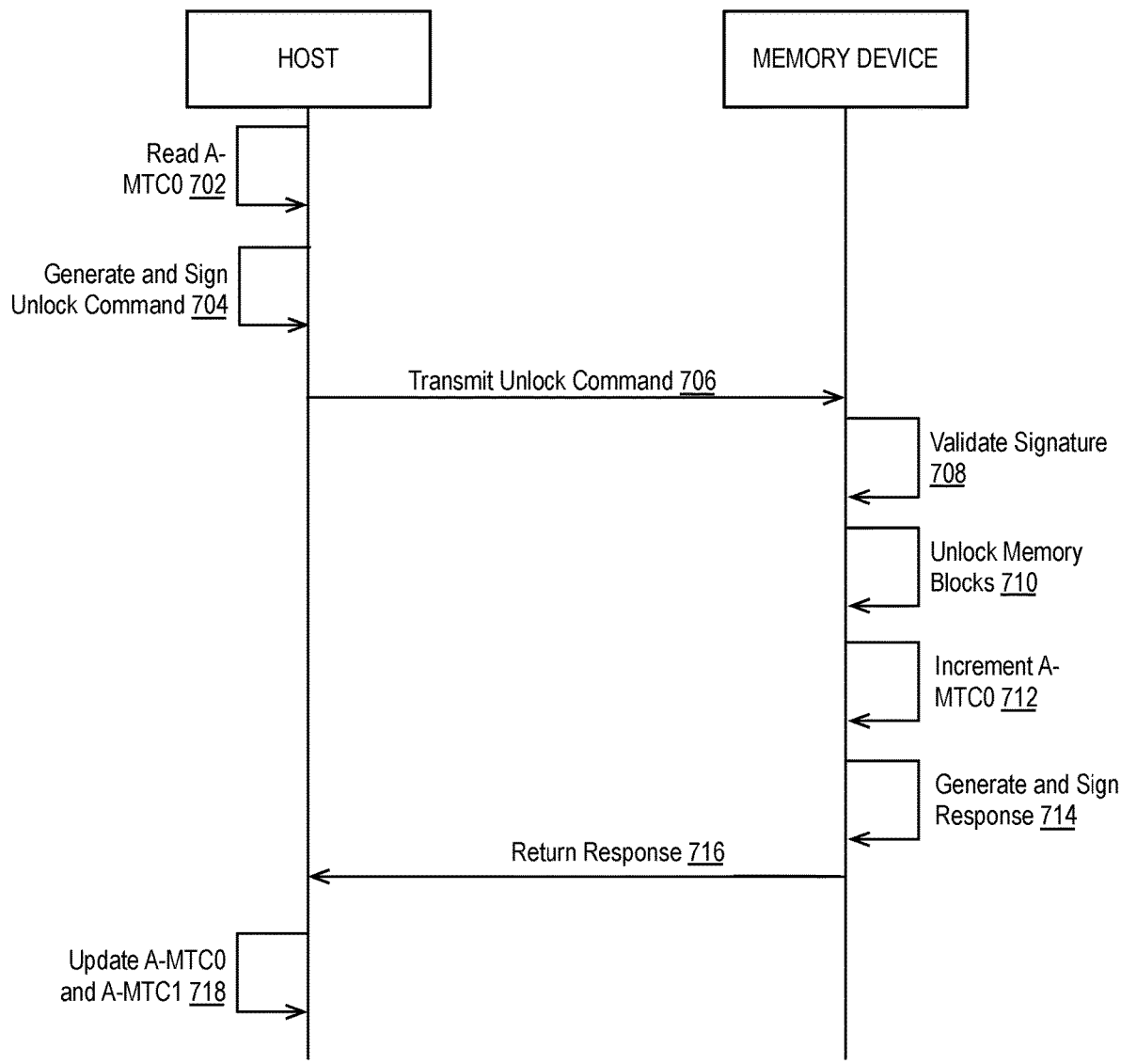
FIG. 7 is a swim lane diagram illustrating secure commands for securing locking and unlocking blocks of a memory device according to some embodiments of the disclosure.

FIG. 7 is a swim lane diagram illustrating secure commands for securing locking and unlocking blocks of a memory device according to some embodiments of the disclosure.

In step 702, the host device reads the value of A-MTC0. As described above, the host device receives the most up-to-date value of A-MTC0 from the memory device. In step 702, the host device reads this current value prior to sending the unlock command.

In step 704, generates and signs an authenticated lock or unlock command. In one embodiment, the authenticated lock or unlock includes a command type field identifying the command as an unlock command and the value of A-MTC0. The authenticated lock or unlock is then signed using the session key shared between the host device and memory device. The foregoing operations are similar to previous operations and are not repeated in detail herein. In some embodiments, the authenticated lock or unlock command may include block addresses for blocks to unlock. In other embodiments, the unlock command may apply to all blocks in the memory device.

In step 706, the host device issues the signed authenticated lock or unlock command to the memory device.

In step 708, the memory device validates the signature. In the illustrated embodiment, the memory device extracts the non-signature bytes of the command and generates its own signature using the session key. If the signature generated by the memory device matches the signature in the command (e.g., by comparing the values), the memory device confirms the authenticity of the sender.

In step 710, the memory device unlocks one or more blocks of the memory device. As used herein, a block lock refers to the protection of an entire memory device or ranges of blocks from being programmed and erased. In traditional memory devices, however, there are no constraints on locking or unlocking blocks from a hardware level. Thus, in existing memory devices with blocking locking, the block lock prevents programming and erasing by malicious users, but those same users can unlock the block lock with impunity, thus defeating the purposes of the block locking.

In some embodiments, the memory device maintains a private register that stores the authenticated lock status. Since the authenticated lock or unlock command is signed, only an authenticated user can update this register. In some embodiments, the memory device will prevent legacy unlock operations when the register indicates that an authenticated lock command was received and a corresponding authenticated unlock command was not received. When an authenticated unlock command is received, the register is updated and future legacy program and erase commands function normally. In this manner, a manufacturer or other entity with root key access can utilize an authenticated unlock command and legacy program/erase command to quickly program or erase a device before issuing an authenticated lock command to prevent future unauthenticated programs or erases. Since legacy program/erase operations do not require signature generation, they can be performed quicker than more secure operations requiring such a signature.

Next, in step 712, the memory device increments an MTC. In the illustrated embodiment, this MTC corresponds to the secure command MTC and is labeled as A-MTC0. As discussed, the memory device increments the value of A-MTC0 for each secure command that successfully completes. Details of this step have been provided in step 308 of FIG. 3 and are not repeated herein. Optionally, the memory device may not increment A-MTC0 for an authenticated lock or unlock command if the memory device is only configured to update A-MTC0 for secure writing operations.

In step 714, the memory device generates a response packet and signs the response.

In step 716, the memory device returns the signed message to the host. As discussed previously with respect to other commands, the signed message includes at least the value of A-MTC0, A-MTC1 (if transmitted), and a signature.

In step 718, the host extracts the value of A-MTC0 and A-MTC1 (if transmitted) and locally stores these values. In this manner, both the memory device and host are synchronized with the values of A-MTC0 and A-MTC1, as will be discussed. This is because the memory device continuously provides the freshest value of A-MTC0 during each secure command, thus enabling the host to manage synchronization.

In addition to the above-described commands, the memory device may support a signed transactional command set. This set includes a command to start a transaction and a second command to finalize a transaction, supporting transaction operations on the underlying memory media.

The foregoing embodiments provide various improvements and benefits over existing memory devices such as NOR Flash devices. As an initial benefit, the foregoing commands enable the re-use of existing NOR drivers. Specifically, the commands are designed to re-utilize familiar RPMC hardware sequencing and only require security-specific middleware to support the additional commands. The provision and de-provision commands allow for security commands to be turned on and off programmatically. Thus, a memory device may be provisioned or de-provisioned in a factory setting or in the field. Further, platform boot and read performance is preserved by fully supporting legacy read operations. Finally, legacy non-volatile block locking is enhanced with cryptographic protections when combined with the authenticated lock or unlock command. Specifically, locked blocks can only be unlocked with the authenticated lock or unlock command and may only be modified while locked by using the authenticated modify command. Legacy software may still erase blocks when unlocked using insecure commands but the use of authenticated lock or unlock and modify commands allows for more customizable control of security features, notably when a device passes through a supply chain.

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A memory device comprising:
   a controller configured to decode and execute commands issued by a host device;
   a cryptographic engine, the cryptographic engine configured to authenticate a subset of the commands, the subset of the commands each including a digital signature; and
   a first monotonic counter, the first monotonic counter being incremented after executing at least some of the subset of the commands, wherein the at least some of the subset of the commands includes one or more commands other than a dedicated increment counter command, wherein a value of the first monotonic counter is used by the cryptographic engine in the memory device to generate the digital signature to authenticate the subset of the commands and wherein the memory device returns the value of the first monotonic counter in each response to a successfully executed secure command.

2. The memory device of claim 1, further comprising: a second monotonic counter, the second monotonic counter incremented when the memory device is powered on.

3. The memory device of claim 2, wherein the memory device generates the digital signature by performing a hash-based message authentication code (HMAC) operation on a payload using a session key.

4. The memory device of claim 3, wherein the session key is generated by performing the HMAC operation on a value of the second monotonic counter.

5. The memory device of claim 1, wherein the controller is configured to return the value of the first monotonic counter in response to each secure command issued by the host device.

6. The memory device of claim 1, wherein the controller is configured to return the value of the first monotonic counter in response to each secure command issued by the host device that writes data to the memory device.

7. The memory device of claim 1, the subset of the commands including one of a provision command, de-provision command, authenticated modify command, write register command, authenticated lock, and authenticated unlock command.

8. A method comprising:
   receiving, at a memory device, a secure command from a host device, the secure command comprising a first digital signature;
   authenticating, by the memory device, the secure command by generating a second digital signature for the secure command and comparing the second digital signature to the first digital signature;
   incrementing, by the memory device, a first monotonic counter upon successful completion of the secure command, wherein the first monotonic counter is incremented for each secure command executed by the memory device;
   generating, by the memory device, a response to the secure command, the response including a value of the first monotonic counter and a value of a second monotonic counter;
   signing, by the memory device, the response; and
   returning, by the memory device and to the host device, the response including the value of the first monotonic counter and the value of the second monotonic counter.

9. The method of claim 8, further comprising: incrementing the second monotonic counter, the second monotonic counter incremented when the memory device is powered on.

10. The method of claim 9, further comprising: generating a session key using the value of the second monotonic counter.

11. The method of claim 10, wherein the session key is generated by performing a hash-based message authentication code (HMAC) operation on the value of the second monotonic counter upon powering on the memory device.

12. The method of claim 10, wherein the second digital signature is generated by performing a hash-based message authentication code (HMAC) operation on a payload using the session key.

13. The method of claim 12, wherein the secure command comprises: a provision command, and the method further comprises:
    enabling processing of secure commands in response to executing the provision command.

14. The method of claim 12, wherein the secure command comprises: a de-provision command, and the method further comprises:
    disabling processing of secure commands in response to executing the de-provision command.

15. The method of claim 12, wherein the secure command comprises: an authenticated modify command, and the method further comprises:
    programming or erasing data stored by the memory device in response to the authenticated modify command.

16. The method of claim 12, wherein the secure command comprises: a write register command, and the method further comprises:
    writing data to a register of the memory device in response to the write register command.

17. The method of claim 12, wherein the secure command comprises: an authenticated lock command, and the method further comprises;
    locking one or more blocks of the memory device in response to the authenticated lock command.

18. The method of claim 12, wherein the secure command comprises: an authenticated unlock command, and the method further comprises:
    unlocking one or more blocks of the memory device in response to the authenticated unlock command.

19. The method of claim 8, wherein the secure command comprising one of a provision command, de-provision command, authenticated modify command, write register command, authenticated lock, and/or authenticated unlock command.

20. The method of claim 8, further comprising: receiving an insecure command and executing the insecure command, whereby a second value of the first monotonic counter is not incremented in response to the insecure command.

* * * * *